(12) United States Patent
Sung

(10) Patent No.: US 7,172,745 B1
(45) Date of Patent: Feb. 6, 2007

(54) SYNTHESIS OF DIAMOND PARTICLES IN A METAL MATRIX

(76) Inventor: Chien-Min Sung, No. 4, Lane 32, Chung-Cheng Road, Tansui, Taipei County (TW) 23911

( * ) Notice: Subject to any disclaimer, the term of this patent is extended or adjusted under 35 U.S.C. 154(b) by 143 days.

(21) Appl. No.: 10/900,037

(22) Filed: Jul. 26, 2004

Related U.S. Application Data

(60) Provisional application No. 60/490,170, filed on Jul. 25, 2003.

(51) Int. Cl.
*B01J 3/08* (2006.01)
*B01J 3/06* (2006.01)

(52) U.S. Cl. .................................... 423/446

(58) Field of Classification Search ............... 423/446
See application file for complete search history.

(56) References Cited

U.S. PATENT DOCUMENTS

| | | | |
|---|---|---|---|
| 2,947,611 A | | 8/1960 | Bundy |
| 3,030,188 A | | 4/1962 | Eversole |
| 3,238,019 A | | 3/1966 | De Carli |
| 3,401,019 A | | 9/1968 | Cowal et al. |
| 4,273,561 A | | 6/1981 | Fernandez-Moran Villalobos |
| 4,377,565 A | | 3/1983 | Setaka |
| 4,483,836 A | | 11/1984 | Adadurov et al. |
| 4,578,260 A | * | 3/1986 | Kuroyama et al. ......... 423/446 |
| 4,968,647 A | | 11/1990 | Ownby |
| 5,110,577 A | | 5/1992 | Tamor et al. |
| 5,209,916 A | | 5/1993 | Gruen |
| 5,243,170 A | | 9/1993 | Maruyama et al. |
| 5,614,258 A | | 3/1997 | Moskovits et al. |
| 5,690,794 A | * | 11/1997 | Molchanov et al. ... 204/157.47 |
| 6,315,871 B1 | | 11/2001 | Daulton et al. |
| 2003/0228249 A1 | * | 12/2003 | Fujimura et al. ......... 423/446 |
| 2005/0255029 A1 | * | 11/2005 | Turpin et al. ............ 423/446 |

OTHER PUBLICATIONS

Vlodarchik, E. and R. Trebinski, "Transformations of Graphite and Boron Nitride in Shock Waves," Shock Waves, vol. 7 1997, pp. 231-247.
Britun, V.F., A.V. Kurdyumov and I.A. Petrusha, "Diffusionless Nucleation of Lonsdaleite and Diamond in Hexagonal Graphite Under Static Compression," Powder Metallurgy and Metal Ceramics, vol. 43, Nos. 1-2, 2004, pp. 87-93.
Gogotsi, Yury G., "Pressure-induced Phase Tansformations in Diamond," Journal of Applied Physics, vol. 84, No. 3, Aug. 1, 1998, pp. 1299-1304.

\* cited by examiner

*Primary Examiner*—Stuart L. Hendrickson
*Assistant Examiner*—Alvin T Raetzsch
(74) *Attorney, Agent, or Firm*—Thorpe North and Western, LLP

(57) ABSTRACT

Methods of synthesizing superabrasive particles such as diamonds and cubic boron nitride are disclosed and described. One procedure includes providing a superabrasive precursor including a source material in a metal matrix. The carbon source can contain a majority of carbon atoms oriented in a rhombohedral polytype configuration. A shock wave can be passed through the carbon source that is sufficient to convert the diamond to graphite. The superabrasive precursor can be formed by dissolving hexagonal carbon in a suitable molten metal or by mixing particulate components. Similarly, hexagonal boron nitride can be used in a metal matrix which is subjected to a shock wave having sufficient energy to form cubic boron nitride. The superabrasive particles produced using these methods can be provided at relatively high yields with reduced costs.

18 Claims, 2 Drawing Sheets

SYNTHESIS OF DIAMOND PARTICLES IN A METAL MATRIX

CLAIM OF PRIORITY

This application claims priority to U.S. Provisional Patent Application No. 60/490,170, filed Jul. 25, 2003, which is incorporated herein by reference in its entirety.

FIELD OF THE INVENTION

The present invention relates to methods for synthesizing superabrasives such as diamond and cubic boron nitride. Accordingly, this invention involves the fields of chemistry, materials science, metallurgy, and geology.

BACKGROUND OF THE INVENTION

The production of synthetic diamond is a process that has received much attention over the years and been sought for a variety of industrial applications. Today a number of diamond synthesis processes are known, several of which have been successfully commercialized. Examples of various diamond synthesis methods can be found in U.S. Pat. Nos. 2,947,611; 3,030,188; 3,238,019; 3,401,019; 4,377,565; 4,483,836; 5,209,916; 5,614,258; and 6,315,871, each of which are incorporated herein by reference.

At the basis of many diamond synthesis processes is the application of a tremendous amount of heat and pressure to a carbon source, such as graphite. One method of particular interest involves the conversion of graphite to diamond via a shock wave produced by an explosion. This process was introduced during the 1960's, and is described in U.S. Pat. No. 3,238,019. Generally speaking, the process involves placing a carbon source such as graphite in close proximity to an explosive element which is then detonated. The shock waves produced by the explosion apply a pressure and a temperature to the graphite that is adequate to convert the graphite to diamond.

While many of the above-referenced processes have been successfully commercialized, most remain expensive and inefficient. For example, despite the fact that the shock wave synthesis method has been commercially used by DuPont deNemours, Co. for several decades now, it is still little better than about 15% efficient. Therefore, the cost of diamond particles yielded by the process is quite expensive remaining at approximately $2.00 per carat or more.

As a result, methods for efficient and cost effective synthesis of diamond and other superabrasives continue to be sought through on-going research efforts.

SUMMARY OF THE INVENTION

Accordingly, the present invention provides methods of improved efficiency for synthesizing superabrasive particles from a superabrasive precursor. The superabrasive precursor can include a source material distributed in a metal matrix. The source material can be a rhombohedral graphite source having a majority of carbon atoms oriented in a rhombohedral polytype configuration. The rhombohedral graphite source is suitable for synthesis of diamond particles. Alternatively, the source material can be hexagonal boron nitride which is suitable for synthesis of cubic boron nitride particles. A shock wave can be passed through the source material that is sufficient to convert the source material to superabrasive particles.

In one aspect, at least about 80% of the carbon atoms of the graphite source can be oriented in a rhombohedral polytype configuration. In yet another aspect, the carbon atoms of the graphite source can be substantially all oriented in a rhombohedral polytype configuration.

The rhombohedral polytype graphite can be obtained by using various methods. However, in one aspect, the rhombohedral graphite can be provided by dissolving carbon in a molten metal, and then solidifying the molten metal to form the superabrasive precursor. While a number of metal types may be used as the carbon solvent, in one aspect, the metal can be selected from the group consisting of Fe, Co, Ni, Mn, Cr, and semi-alloys or alloys thereof. In another aspect, the metal can be Fe. Further, while the amount of carbon added to the molten metal can be nearly any amount desired, in one aspect, the amount of carbon can be sufficient to substantially saturate the metal with the carbon. Alternatively, additional carbon can be added beyond the saturation point of the metal for carbon such that a mixture of undissolved carbon and molten metal saturated with dissolved carbon is formed.

Once the carbon is dissolved in the molten metal and has been converted to the rhombohedral polytype of graphite, the metal can be solidified in preparation to receive a shock wave. Optionally, prior to solidification, the metal can be shaped into a number of configurations that facilitate easy handling thereof, and which can in some respects contribute to the ease of converting graphite to diamond. Further some shapes can allow use of various shock wave sources which may otherwise be ineffective. Examples of such shapes include without limitation, bars, sheets, rods, etc. Additionally, the solidified metal containing the rhombohedral graphite can be cut into sections, or otherwise reduced in size or shaped, following solidification, but prior to application of the shock wave.

In yet another alternative embodiment, the superabrasive precursor can be provided by forming a mixture of powdered metal and powdered source material. For example, a mixture of hexagonal graphite and powdered metal can be mechanically mixed in a device sufficiently to form rhombohedral graphite from the hexagonal graphite. A non-limiting example of a suitable device can be an attritor, such as those used to form mechanical alloys or semi-alloys.

The shock wave that is applied to the superabrasive precursor can be from any source that produces a shock wave sufficient to convert the source material to superabrasive particles. Typically, the amount of pressure that must be produced by the impact to effect the conversion of graphite to diamond is from about 5 GPa to about 100 GPa. In another aspect, the pressure can be from about 8 GPa to about 20 GPa. However, this range may vary somewhat depending on a variety of factors that will be recognized by those of ordinary skill in the art, such as the size and thickness of the solidified metal containing the carbon, etc. In one aspect, as is known in the art, the shock wave can be supplied by an explosion. In another aspect, the shock wave can be provided by physically impacting the superabrasive precursor.

Once the conversion from the source material to superabrasive particle has taken place, the superabrasive particles can be harvested from the solidified metal. Those of ordinary skill in the art will recognize a variety of mechanisms for separating the metal from the superabrasive particles, such as acid dissolution of the metal, or electrolytic or gaseous removal of the metal.

In some instances, it can be advantageous to remove the graphite from the metal once it has been converted to the rhombohedral form, and before the shock wave is applied to convert it to diamond. By so doing, it is possible to greatly improve the efficiency of making diamond tools or masses by converting the rhombohedral graphite into diamond as part of the tool fabrication process. In this manner the extra step of heating and pressing the graphite simply to convert the graphite to diamond can be avoided, and the overall process of producing diamond tools, or a polycrystalline diamond mass is greatly improved.

Accordingly, the present invention additionally provides a method of making a diamond body that includes: a) providing a particulate graphite source having a majority of carbon atoms oriented in a rhombohedral polytype configuration; b) shaping the particulate graphite source into a desired shape for the mass, said desired shape having a porosity from about 0% to about 25%; and c) applying a sufficient amount of heat and pressure to the graphite source to convert the graphite particles to diamond and to consolidate the diamond particles into the diamond body. Notably, the processing options and limitation as recited above for the production of diamond are applicable in the process of making such diamond aggregates as well. Those of ordinary skill in the art will recognize a number of additional processing steps and ingredients that can be added to the basic process outlined above. However, in one aspect, the method of making diamond aggregates can additionally include adding a binder agent to the graphite particles prior to heating and pressing the particles. In another aspect, the binder agent can be Co.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

A. Definitions

Figure 1:
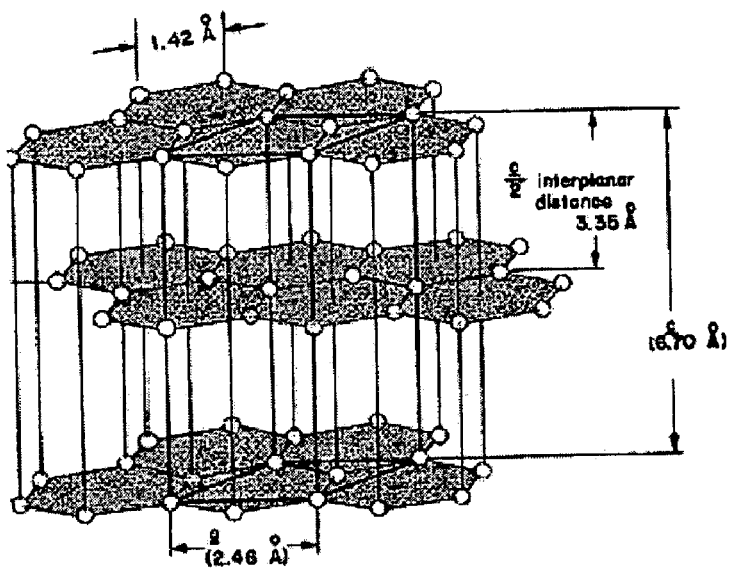
FIG. 1 shows a perspective view of hexagonal graphite having a stacked graphene plane sequence (ABAB) as is known in the prior art.

In describing and claiming the present invention, the following terminology will be used.

The singular forms "a," "an," and "the" include plural referents unless the context clearly dictates otherwise. Thus, for example, reference to "a carbon source," or "the carbon source," includes reference to one or more specific sources of carbon, and reference to "an extraction process" includes reference to one or more of specific processes for extraction.

As used herein, "rhombohedral graphite," and "rhombohedral polytype graphite" may be used interchangeably, and refer to an allotropic form of graphite with an ABCABC stacking sequence of graphene layers. Rhombohedral graphite is well known in the chemical arts and is contained in the *IUPAC Copendium of Chemical Terminology* ($2^{nd}$ ed. 1997), which is incorporated herein by reference.

As used herein, "hexagonal graphite," and "2H graphite" may be used interchangeably, and refers to an allotropic form of graphite with an ABAB stacking sequence of graphene layers. Hexagonal graphite is well known in the chemical arts and is contained in the *IUPAC Copendium of Chemical Terminology* ($2^{nd}$ ed. 1997), which is incorporated herein by reference.

As used herein, "shock wave" refers to a wave of significant energy, such as a large amplitude compression wave produced by an impact or explosion.

Concentrations, amounts, solubilities, volumes, weight percents, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 0.01 to 20 should be interpreted to include not only the explicitly recited limits of 0.1 and 20 but also to include individual values within that range, such as 0.5, 1.0, 5, 10, 15, and sub-ranges such as 0.5–5, 5–10, 10–15, etc. This interpretation applies to open-ended ranges reciting only one numerical value as well, such as "less than about 20," and should apply regardless of the breadth of the range or the characteristic being described.

B. The Invention

The present invention involves methods for making synthetic superabrasive particles such as diamond or cubic boron nitride from a superabrasive precursor. The superabrasive precursor can include a source material distributed in a metal matrix. The source material can be a rhombohedral graphite source suitable for synthesis of diamond particles. Alternatively, the source material can be hexagonal boron nitride which is suitable for synthesis of cubic boron nitride particles. A shock wave can be passed through the source material that is sufficient to convert the source material to superabrasive particles.

In accordance with the present invention, the source material can have adjacent crystallographic planes wherein individual atoms are aligned in a configuration which allows for conversion to a superabrasive material upon application of a sufficiently energetic shock wave. Typically, this requires that individual atoms have corresponding atoms in adjacent crystallographic planes to which they can be bonded.

Referring now to FIG. 1 there is shown a section of hexagonal graphite. This is the most common isotropic form of graphite which is arranged with graphene layers in the ABA arrangement. Accordingly, only half of the carbon atoms find corresponding carbon atoms in the adjacent graphene planes. As such, the graphite, even if deformed by a shock wave of significant force will spring back to its original configuration. Common sources of hexagonal graphite can have up to about 15 wt % rhombohedral graphite.

Figure 2:
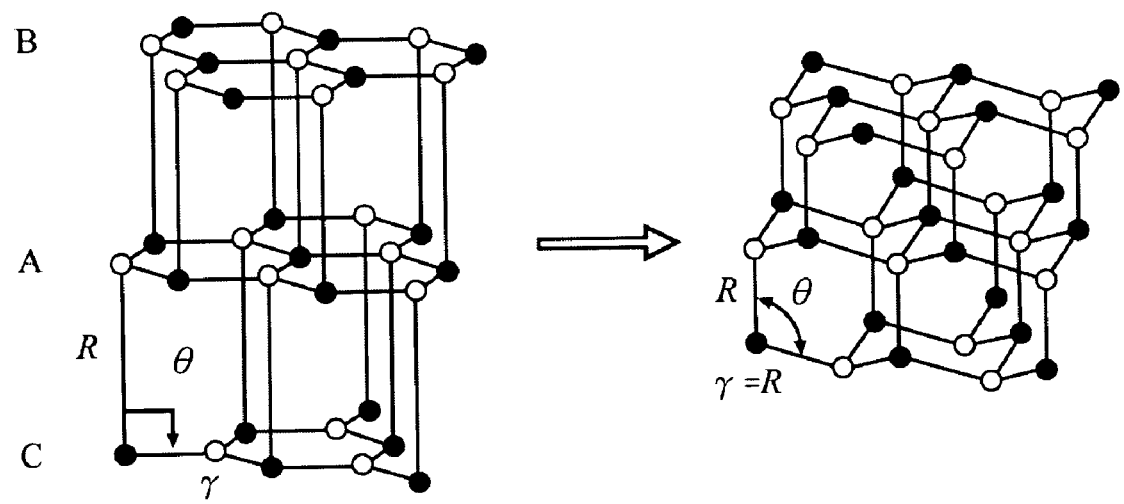
FIG. 2 shows a side view of rhombohedral graphite having a stacked graphene plane sequence (ABCABC) and the structural changes that occur during the process of converting such graphite into diamond in accordance with one embodiment of the present invention.

By contrast, FIG. 2 shows a section of rhombohedral graphite and the resultant conversion to diamond upon application of a shock wave with sufficient energy. As can be seen, this isotropic form of graphite is arranged with graphene layers in the ABCABC arrangement, so that each carbon atom in each layer has a corresponding carbon atom in one of the two adjacent graphene layers. As such, upon application of a shock wave of sufficient energy, the graphite is converted to cubic diamond as shown.

Accordingly, a method for synthesizing diamond can include providing a graphite source having a majority of carbon atoms oriented in a rhombohedral polytype configuration, and passing a shock wave through the graphite that is sufficient to convert the graphite to diamond. Notably, it is desirable to have as much of the graphite as possible configured with carbon atoms oriented in rhombohedral form. In one aspect, at least about 80% of the carbon atoms of the graphite source can be oriented in a rhombohedral polytype configuration. In another aspect, substantially all of the carbon atoms in the carbon source can be oriented in a rhombohedral configuration.

Alternatively, the source material can be hexagonal boron nitride (hBN) source. Hexagonal boron nitride has a stacking sequence of AaAa which is conducive to formation of cubic boron nitride upon application of a shock wave. The hBN source can comprise or consist essentially of hBN. In most cases, it can be desirable to provide an hBN source which consists essentially of hBN.

Figure 3:
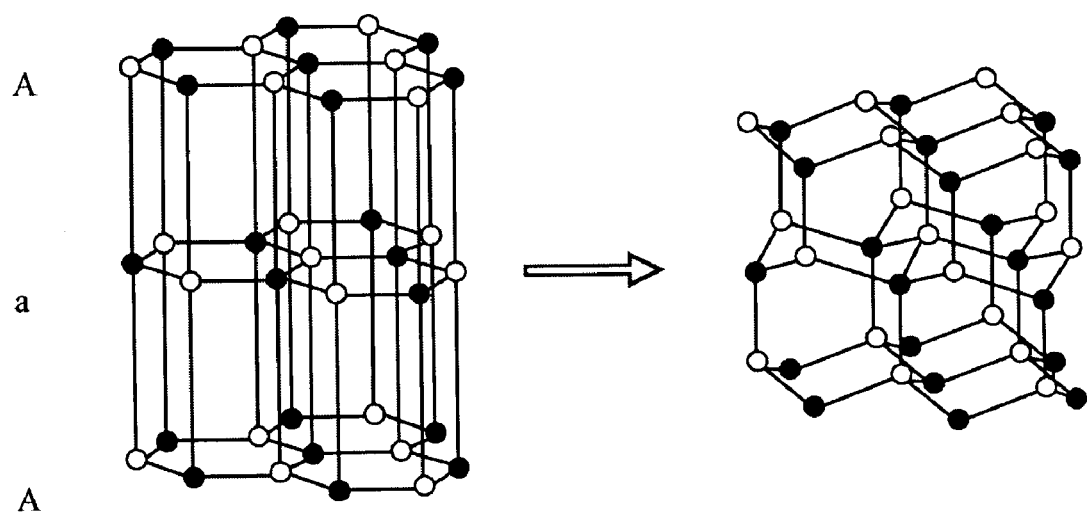
FIG. 3 shows a side view of lonsdaleite graphite having a stacked graphene plane sequence of (AaA), and the structural changes that occur during the process of converting such graphite into lonsdaleite in accordance with one embodiment of the present invention.

Referring to FIG. 3 is shown one form of hexagonal graphite that is capable of forming diamond via shock wave synthesis. This isotropic form known as lonsdaleite has an AaA graphene planar arrangement, which results in all carbon atoms having a corresponding carbon atom in adjacent graphene planes. Therefore, upon application of a shock wave with sufficient energy, diamond will be formed. However, because of the lonsdaleite configuration, the diamond formed is hexagonal rather than cubic. Notably, lonsdaleite is rare occurring naturally only at certain meteor impact sites. However, researchers have developed methods which allow synthetic production of lonsdaleite which may make this form of graphite a potentially useful starting material for use in the present invention.

Thus, the methods of the present invention can be useful for producing superabrasive materials from source materials which have an interplanar arrangement wherein each atom within a plane have a corresponding atom in an adjacent plane. Thus, planar arrangements of ABCABC and AaA can be used while a planar arrangement of ABA such as that found in hexagonal graphite is generally not suitable.

Applicant has identified that hexagonal graphite can be converted to rhombohedral graphite upon dissolution with certain metal catalysts. Accordingly, in one aspect, the rhombohedral graphite used in the present invention can be provided by dissolving carbon in a molten metal and then solidifying the molten metal to form the superabrasive precursor. While not wishing to be bound by any particular theory, it is thought that the ability of the molten metal to convert hexagonal graphite into a rhombohedral polytype is due to the attraction of electrons in the graphite by empty shells in the d-orbitals of the metal. Because graphene planes are held together by weak Van der Waals forces, the attraction of unpaired or "dangling" electrons in carbon atoms at the outer edges of the carbon mass is sufficient to shuffle the graphene planes into the rhombohedral configuration.

A variety of metals are deemed suitable for use in the methods of the present invention. However, in one aspect, the metal matrix can comprise a carbon solvent. For example, common carbon solvents can be a member selected from the group consisting of Fe, Co, Ni, Mn, Cr, and semi-alloys or alloys thereof. In another aspect, the metal can comprise or consist essentially of Fe. In another aspect, the metal can be Co. In one aspect of the present invention, the metal matrix can be substantially free of copper or other non-carbon solvent metals.

As a practical matter, it should be noted that while any amount of carbon from nearly any carbon source can be added to the molten metal, that it is preferable to add enough carbon so that the molten metal becomes substantially saturated with the carbon. In this manner, a more efficient diamond yield is achieved from application of a shock wave. As a general guideline, the typical saturation point of carbon in carbon solvent metals is less than about 5 wt %. For example, carbon can be dissolved in iron up to about 4 wt %, while nickel and cobalt can dissolve up to about 3 wt % carbon.

Additionally, in some embodiments it can be desirable to add excess carbon such that a mixture of undissolved carbon and metal having dissolved carbon therein is formed. In this manner the content of rhombohedral graphite can be increased per volume of superabrasive precursor, thus increasing yields of diamond per volume of precursor. Thus, in accordance with an aspect of the present invention, additional carbon can be included in the superabrasive precursor. In one aspect, the carbon content of the superabrasive precursor can be from about 1 wt % to about 20 wt %, inclusive of dissolved and undissolved carbon. In one additional aspect, the undissolved carbon content of the superabrasive precursor can be from about 8 wt % to about 15 wt %. One non-limiting example of a suitable superabrasive precursor is high carbon cast iron.

Further, as a practical matter it should be noted that while the superabrasive precursor can be solidified into nearly any shape or design, that certain designs or configurations are preferential, and can be somewhat determinative of the additional processing steps to be taken. However, in one aspect, the molten metal having the carbon dissolved therein can be shaped into either a bar, a sheet, or a rod prior to solidification. In one aspect, the configuration can be a rod.

Additionally, the molten metal may be further shaped or treated after solidification, but before application of the shock wave. For example, in one aspect, the solidified metal can be cut into sections, such as discs or segments.

In another alternative embodiment of the present invention, the superabrasive precursor can be provided by forming a mixture of particulate metal and powdered source material. For example, a particulate metal and hexagonal graphite can be provided and then mechanically mixed sufficiently to form rhombohedral graphite from the hexagonal graphite. Typically, this mechanical mixing can be accomplished using a high shear mixer such as an attritor commonly used for forming mechanical alloys, i.e. semi-alloys. The mechanical mixing causes partial melting of the particulate metal sufficient to at least partially convert the hexagonal graphite to rhombohedral graphite. Although this embodiment can result in a somewhat lower conversion than when using molten metal, the results can be satisfactory. Additionally, conversion of hexagonal to rhombohedral graphite can be increased by lengthening the mechanical mixing time. The mixture can be formed with almost any content of graphite; however, a graphite content of from about 15 wt % to about 70 wt %, and often about 50 wt %.

In yet another alternative embodiment, the rhombohedral graphite can be formed using deposition techniques such as arc evaporation of graphite or sputtering of graphite under specific conditions. For example, U.S. Pat. No. 4,273,561, which is incorporated by reference herein, describes several exemplary processes for forming rhombohedral graphite which can be used in connection with the present invention.

When synthesizing superabrasive cBN particles, the superabrasive precursor can further comprise additional catalyst materials such as alkali metals, alkali earth metals, and compounds thereof. Several non-limiting specific examples of such catalyst materials can include lithium, calcium, magnesium, nitrides of alkali and alkali earth metals such as $Li_3N$, $Ca_3N_2$, $Mg_3N_2$, $CaBN_2$, and $Li_3BN_2$.

The shock wave used in the method of the present invention can be produced by various sources, such as explosions, chemical blasts, physical impact upon the solidified metal, etc. The only proviso with respect to the shock wave is that it must provide a sufficient amount of energy to cause the rhombohedral graphite to "pucker" as show in FIG. 2 and become converted to diamond or to cause the hBN to rearrange to form cBN. In one aspect, the shock wave can provide a pressure of, or an energy equivalent to a pressure of, from about 5 GPa to about 100 GPa. In another aspect, the pressure can be from about 8 GPa to about 20 GPa. Those of ordinary skill in the art will recognize additional specific pressure settings, or additional amounts of shock wave energy that are sufficient to achieve a particularly desired result upon implementation of the methods of the present invention. Further, those of ordinary skill in the art will recognize equipment and reaction configurations which may be useful in harnessing the energy of an explosion, or applying a physical impact to allow a shock wave of sufficient energy to pass through the rhombohedral carbon and effect the conversion to diamond. In addition, the shock wave can be applied under ambient atmospheric conditions such that no special atmosphere or vacuum is necessary.

In one aspect of the present invention, a hammer, anvil, press, or the like can be used to apply the physical impact. In embodiments which involve physical impact, it can be desirable to form the superabrasive precursor into thin sheets to improve transmission of the impact energy throughout the precursor. Additionally, the superabrasive precursor can be placed on a heated surface. For example, a thin, e.g., less than 1 mm, sheet of superabrasive precursor can be laid on a heated surface such as a heated tungsten carbide substrate. An anvil or hammer can then be impacted on the superabrasive precursor with sufficient force to convert at least a portion of the source material to superabrasive particles. Typically, this process can require repeated physical impact in order to achieve valuable yields of diamond or cBN.

In accordance with the present invention, yields of diamond can typically exceed about 20%, and can often range from about 25% to about 70%. Most often, diamond yields can be from about 25% to about 60%. However, yields outside of this range can also be achieved, depending on the metal matrix material, conditions, carbon source material, or the like.

An additional advantage to utilizing the solidified molten metal as the medium in which the shock wave is applied to the graphite is the absence of pores, and high material density of the metal. As a result, the shock wave is able to pass through the graphite at a greater speed. Furthermore, the reduction or absence of pores minimized temperature increases due to the shock wave, and therefore reduces the incidence of the newly formed diamond becoming back converted to amorphous carbon or graphite. This temperature reduction is at least partially due to increased thermal conductivity resulting from a decrease in porosity. In some cases, the temperature can be less than about 1700° C. As a general guideline, the porosity of the superabrasive precursor can be less than about 30% and in most cases is from about 0% to about 25%. When the rhombohedral graphite is provided by using a molten metal, the porosity of the superabrasive precursor can preferably be less than about 5%. In a most preferred embodiment, the superabrasive precursor can be substantially non-porous.

Once diamond is formed, it can be removed from the solidified molten metal in order to be useful for incorporation into a diamond tool. Those of ordinary skill in the art will recognize a variety of ways in which the diamond can be separated from the metal, such as by acid dissolution of the metal, and electrolytic and vapor transport of the metal away from the diamond. The recovered superabrasive particles can be in the micron size range and in some cases can be in the nanometer size range. Typically, these superabrasive particles can have a nanocrystalline structure regardless of the particle size. As such, these particles tend to have beneficial wear characteristics such as reduced scratching and high material removal rates. This is at least partially due to aspect that when the superabrasive particles fracture, the particles fracture along the nano-scale crystalline planes rather than on the rougher macro-scale. Typically, the superabrasive particles produced from molten metal containing rhombohedral graphite result in nanometer sized particles, e.g., less than about 100 nanometers.

In some aspects, it can be desirable to harvest the rhombohedral graphite from the solidified molten metal prior to application of the shock wave force thereto. The rhombohedral graphite can be harvested in the same or similar manner as those recited above for harvesting diamond. Once harvested, the rhombohedral graphite can be converted to diamond by application of a shock wave as recited herein.

Additionally, the harvesting of graphite from the solidified metal prior to application of a shock wave allows the fabrication of polycrystalline diamond (PCD) bodies in a single step, rather than the traditional two step method. Traditionally, the manufacture of a PCD body from synthetic diamond has required that diamond particles first be produced, and then consolidated into the PCD. In each step significant amounts of heat and pressure are required. Accordingly, a mechanism for creating a PCD of synthetic diamond in a single high pressure high temperature step has been sought. Such a method would reduce the costs associated with PCD production by perhaps more than half.

In one aspect of the present invention, a method is provided for producing a PCD with a single high pressure high temperature step. Specifically, the steps for producing diamond as recited above are followed, until the step of passing a shock wave through the graphite. Prior to performing this step, the rhombohedral graphite is harvested from the solidified molten metal. The graphite particulates can then be placed in a mold and given a desired shape for the PCD. At this point, an amount of heat and pressure that is sufficient to convert the graphite particles to diamond and to consolidate the diamond particles into a PCD body is applied. Those of ordinary skill in the art will recognize appropriate pressures and temperatures, and mechanisms for providing such, in order to attain a specific resultant PCD.

Preferably, the porosity of the desired shape is minimized. As a general guideline, the porosity of the desired shape can be less than about 30% using cold isostatic pressing or other similar pressing processes, although porosities of less than 20% can be achieved by hot isostatic pressing, mixing particle sizes to improve packing densities, or other similar processes.

Of course, other ingredients typically used in the fabrication of PCD bodies, such as a binder agent can be added to the mold and used in the present single high pressure high temperature method for manufacturing a PCD. A wide range of ingredients that are suitable for use will be recognized by those of ordinary skill in the art. However, in one aspect, a metal binder agent can be used. However, in one aspect, the binder agent can be Co.

It is to be understood that the above-referenced arrangements are illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the invention as set forth in the claims.

What is claimed is:

1. A method for synthesizing superabrasive particles, comprising:
   a) dissolving a carbon source in a molten metal and then solidifying the molten metal to form a superabrasive precursor including a source material in a metal matrix, said source material including a rhombohedral graphite source having a majority of carbon atoms oriented in a rhombohedral polytype configuration; and
   b) passing a shock wave through the source material that is sufficient to convert the source material to diamond particles.

2. The method of claim 1, wherein the metal matrix comprises a carbon solvent.

3. The method of claim 1, wherein the metal matrix comprises a member selected from the group consisting of Fe, Co, Ni, Mn, Cr, and semi-alloys or alloys thereof.

4. The method of claim 3, wherein the metal matrix comprises Fe.

5. The method of claim 1, wherein at least about 80% of the carbon atoms of the graphite source are oriented in a rhombohedral polytype configuration.

6. The method of claim 1, wherein the carbon atoms of the graphite source are substantially all oriented in a rhombohedral polytype configuration.

7. The method of claim 1, wherein the carbon source is added to the molten metal in an amount that is sufficient to substantially saturate the metal with the carbon atoms.

8. The method of claim 7, wherein the amount is sufficient to form a mixture of undissolved carbon in the molten metal.

9. The method of claim 8, wherein the undissolved carbon comprises from about 8 wt % to about 15 wt % of the superabrasive precursor.

10. The method of claim 1, wherein the molten metal having the carbon dissolved therein is shaped into either a bar, a sheet, or a rod, prior to solidification.

11. The method of claim 1, wherein the solidified molten metal having the carbon dissolved therein is cut into sections after solidification, but prior to passing of the shock wave through the source material.

12. The method of claim 1, further comprising harvesting the superabrasive particles from the superabrasive precursor following passing of the shock wave through the source material.

13. The method of claim 1, wherein the shock wave provides a pressure of from about 8 GPa to about 20 GPa.

14. The method of claim 1, wherein the shock wave is provided by an explosion.

15. The method of claim 1, wherein the shock wave is provided by a physical impact.

16. The method of claim 1, wherein the shock wave is passed through the source material in the absence of a vacuum.

17. The method of claim 1, wherein the superabrasive precursor has a porosity from about 0% to about 25%.

18. The method of claim 17, wherein the superabrasive precursor is substantially non-porous.

* * * * *